Nov. 27, 1962  J. E. O'HARE  3,065,924
FILM LOADING GUIDE
Filed Feb. 2, 1961  2 Sheets-Sheet 1

INVENTOR.
J.E. O'HARE
BY
ATTORNEY
AGENT

Nov. 27, 1962  J. E. O'HARE  3,065,924
FILM LOADING GUIDE

Filed Feb. 2, 1961  2 Sheets-Sheet 2

INVENTOR.
J.E. O'HARE
BY
ATTORNEY
AGENT

3,065,924
FILM LOADING GUIDE
Joe Ervin O'Hare, P.O. Box 113, Kidd St., Shalimar, Fla.
Filed Feb. 2, 1961, Ser. No. 86,771
3 Claims. (Cl. 242—71.2)

This invention relates generally to means for loading the film in the film magazine of an aerial strip type camera and the like and, more particularly, to improved means for forming loops in the film.

In the use of the aerial strip type camera and the like, some means is required both for loading the film in the magazine and, at substantially the same time, forming loops therein. In the previous types of film magazines, metal guide elements have been incorporated therein to both control the loading of the film magazine and the formation of loops therein. Other methods have merely utilized openings in the film magazine to provide space for manually loading the film magazine as well as the formation of loops therein.

It is important to have a film magazine with some means for facilitating both loading thereof and the formation of loops in the film. With the device of the present invention, the previous somewhat cumbersome methods described above are substantially eliminated.

It is the primary object of the invention, therefore, to utilize a film magazine incorporating improved means for loading the film and forming loops therein.

It is a further object of the invention to utilize an improved and unique means for; first, guiding the film in the film magazine during the loading operation; and, second, to facilitate the formation of loops therein.

A still further object of the invention involves an improved film loading guide element utilized with the film magazine to facilitate the loading of the film therein.

Other objects and advantages of the invention will become apparent from the following description, taken in connection with the accompanying drawing in which like reference characters refer to like parts in the several figures.

Figure 1:
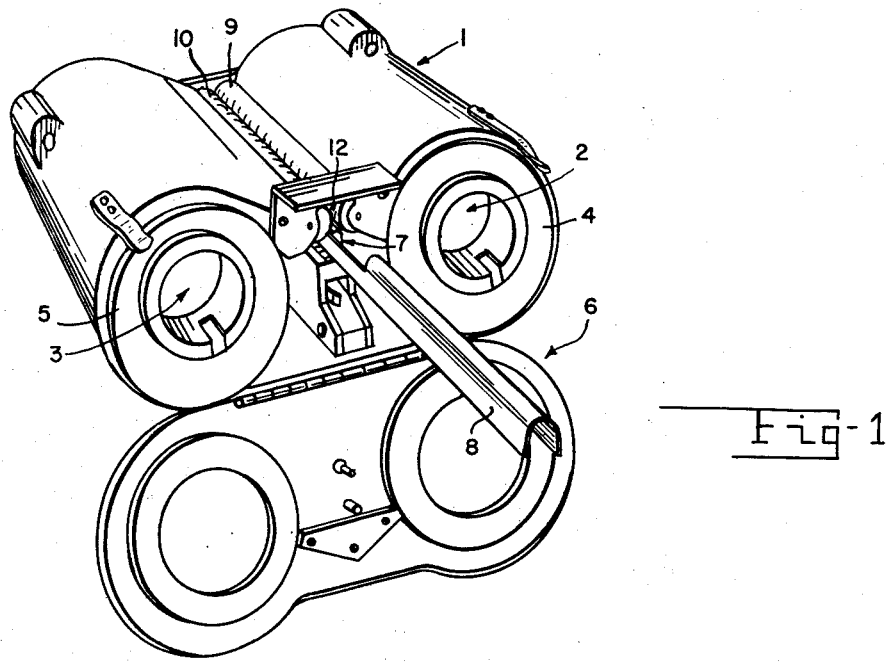
FIG. 1 is a front perspective view of a film magazine illustrating details of the film loading guide and the use thereof, prior to the loading of film therein.

Referring specifically to FIG. 1 of the drawing, the film magazine of the invention is illustrated generally at 1 as having an enlarged transverse opening portion incorporated on its upper surface accommodating the formation of a film loop therethrough and including a supply spool cavity indicated generally at 2 and a take-up spool cavity indicated generally at 3. Within said supply spool and take-up spool cavities 2, 3 are illustrated the empty supply spool and take-up spool indicated respectively at 4 and 5. Said film magazine 1 also includes a magazine cover indicated generally at 6 in the open position. Incorporated within said film magazine at an intermediate position relative to said supply and take-up spool cavities 2, 3 is mounted a pressure plate indicated at 7. Said pressure plate is not shown in FIG. 2 of the drawing since it is hidden by the film indicating guide, indicated at 8, which film loading guide 8 constitutes the key feature of the invention, the operation of which will be described in more detail hereinafter.

Referring again to FIGS. 1 and 4 of the drawing, it is clearly seen that the aforesaid film loading guide 8 is relatively elongated in form and is in the shape of an inverted U with the open side thereof facing downwardly when said film loading guide 8 is in position. Thus, in the operation of the step of FIG. 1, the magazine cover 6 is opened and the pressure plate 7 is released from its normal position and the film loading guide 8 is inserted in position over the top of said pressure plate 7 and in contacting relation with said pressure plate 7 below the pair of rollers indicated at 9 and 10 as incorporated withing said magazine 1. The aforesaid film magazine 1 is now ready to be loaded with film in the manner to be described in more detail hereinafter.

Figure 2:
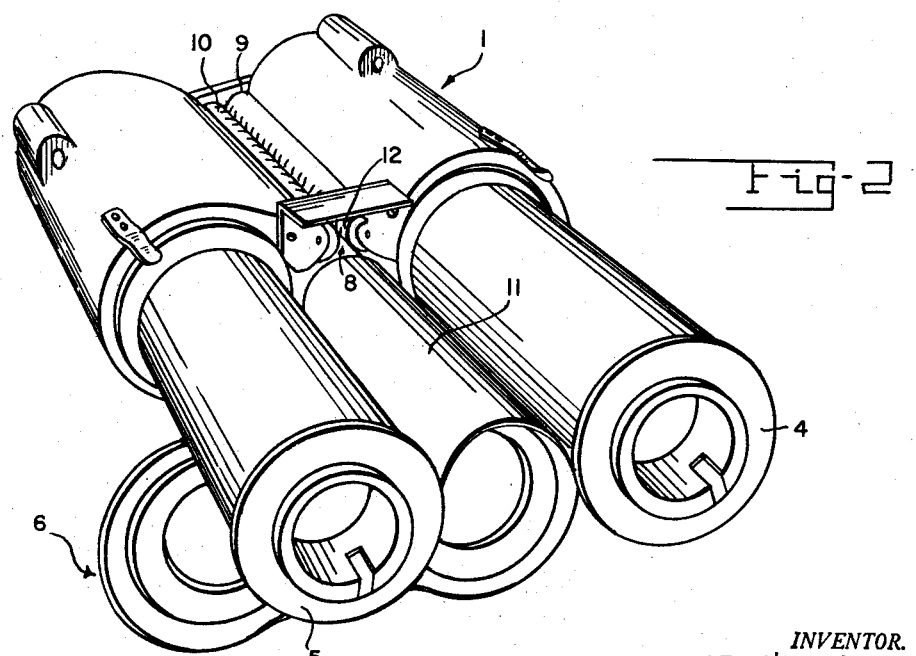
FIG. 2 is a second front perspective view of the film magazine, illustrating the loading of the film and the relation thereof to the film loading guide.

Referring specifically to FIG. 2 of the drawing, the second step in the operation of the invention will now be described. After placing the film loading guide 8 in contacting relation over the top of pressure plate 7 (as hereinbefore described relative to FIG. 1), the previously described supply and take-up spools 4, 5 loaded with film indicated at 11 are then loaded into the film magazine 1. First, with said supply spool 4 in the right hand, the film 11 is directed or slid in contacting relation with the top surface of the aforesaid film loading guide 8 and it and both supply and take-up spools 4, 5 are fully loaded into their respective areas within said film magazine 1. At this point, the film 11 is in position below the rollers 9, 10 and above pressure plate 7, and the final steps in the loading operation and forming a loop therein occurs.

Figure 3:
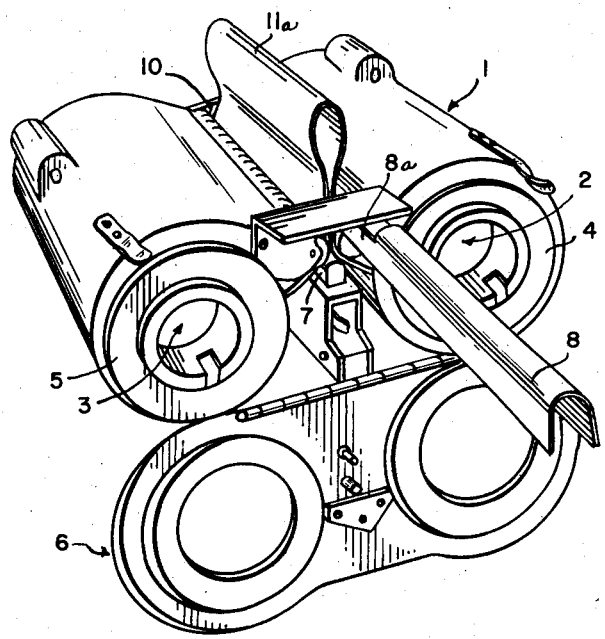
FIG. 3 is a third front perspective view of the film magazine, illustrating additional details thereof when the film is fully loaded and a loop is formed therein; and, FIG. 4 is an enlarged top perspective view of the film loading guide.
Figure 4:
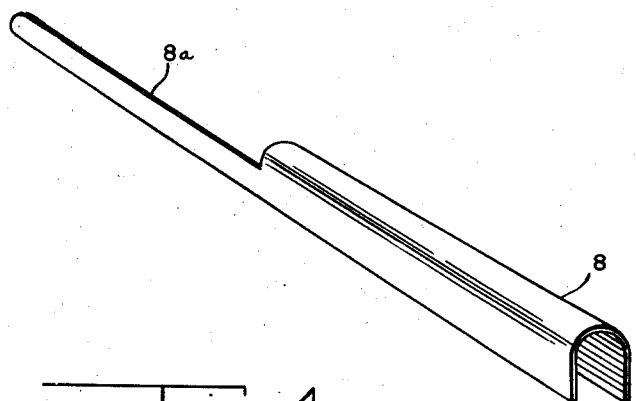

As seen specifically in FIG. 3 of the drawing, the above-described position of the film within film magazine 1 has been completed, at which time said film loading guide 8 is partially removed from its inwardmost position of FIG. 2 until only the relatively narrow, projecting arm portion indicated at 8a in FIG. 4 of the drawing as an extension on one end of said film loading guide 8 remains entirely within the film magazine 1 in contact with the lower surface of film 11. It is then only necessary to lift upwardly on said film loading guide 8 to effect a pushing action between the aforesaid projecting arm portion 8a and the film 11 in an upward direction through the narrow slot 12 formed between rollers 9 and 10 and through the film opening formed on the upper surface of the film magazine 1 to form the desired loop outside the magazine. The film may then be grasped and the loop enlarged to the desired size indicated at 11a in FIG. 3 of the drawing. The only steps remaining then are to remove the loading guide 8 from its engagement within the film magazine 1, restore the pressure plate 7 to its operating position, and close the magazine cover 6. The film magazine is then ready for use.

Thus, a new and improved means for loading the film in a film magazine and forming a loop therein with a unique film loading guide element has been developed in the present invention. Moreover, the need for the previously utilized metal guide elements which are somewhat cumbersome are now eliminated and, finally, both operating and maintenance costs have been substantially reduced by the film magazine and film loading guide element of the present invention.

I claim:

1. In a film magazine incorporating a film loop opening on the upper surface thereof and having a compartment for receiving a film supply spool and a compartment for receiving a film take-up spool, a pair of rollers mounted within said film magazine arranged in parallel adjacent relation to each other and extending transversely to the film magazine to form a restricted, elongated slot therebetween directly beneath the film loop opening, a pressure plate incorporated within said film magazine below the bottom surfaces of said pair of rollers, means associated with said pressure plate and said pair of rollers for guiding film therebetween and directing said film upwardly through the restricted, elongated slot to form a loop in the film, said means comprising a relatively elongated film loading guide member positioned adjacent to and immediately below said pair of rollers and in contact with said pressure plate during loading of the film into the magazine.

2. In a film magazine as in claim 1, said loading guide member including an inverted U-shaped portion and a relatively elongated arm portion projecting outwardly therefrom and initially in engagement with said pressure plate upon loading of said film magazine.

3. In a film magazine as in claim 1, said means comprising an elongated element having an arm-like projecting surface initially inserted entirely within the unloaded film magazine in contact with said pressure plate only and subsequently being partially withdrawn therefrom to maintain said arm-like projecting surface in continuous contact with the film extending between said supply and take-up spools, said elongated element being manually actuated in an upward direction to push the film through said elongated slot into a loop formation.

References Cited in the file of this patent

UNITED STATES PATENTS

| 1,970,844 | De La Garde | Aug. 21, 1934 |
| 2,601,955 | Hardenberg | July 1, 1952 |

FOREIGN PATENTS

| 727,920 | Great Britain | Apr. 13, 1955 |